July 21, 1942.  J. REICHEL  2,290,355
PRESERVATION OF DESICCATED BIOLOGICALLY ACTIVE SUBSTANCES
Original Filed July 10, 1936
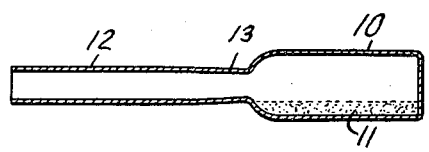
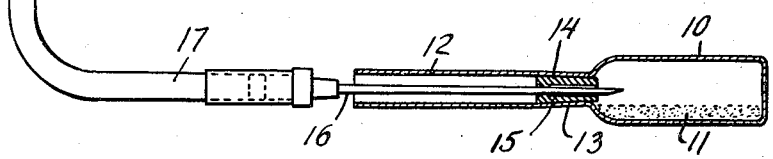
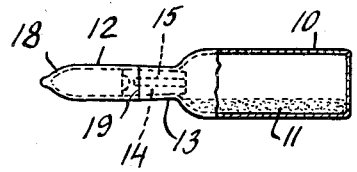
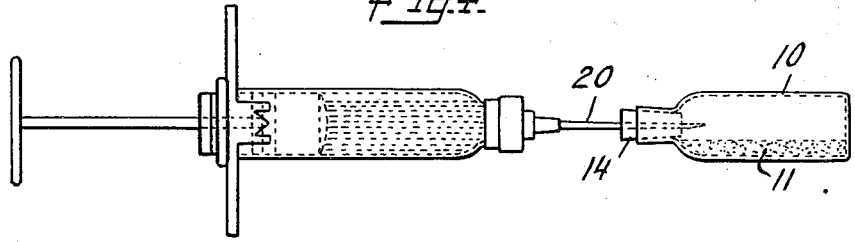
INVENTOR
JOHN REICHEL
BY
A. A. Orlinger
ATTORNEY Patented July 21, 1942

2,290,355

UNITED STATES PATENT OFFICE 2,290,355

PRESERVATION OF DESICCATED BIOLOGICALLY ACTIVE SUBSTANCES

John Reichel, Wynnewood, Pa., assignor to Sharp & Dohme, Incorporated, Philadelphia, Pa., a corporation of Maryland Original application July 10, 1936, Serial No. 90,032. Divided and this application October 6, 1939, Serial No. 298,185

4 Claims. (Cl. 128—272)

The present invention relates to improvements in the preservation of biologically active substances, such as sera, protein solutions, bacterial cultures, pharmaceutical and glandular substances, viruses and other labile biological substances; and it relates more particularly to improvements in final containers for sealing such substances under a high vacuum after treating such substances by freezing and dehydration under a high vacuum, and includes an improved process for the production of such desiccated substances in a final container sealed under vacuum, and provided with means by which water or other liquid can be readily introduced into the container without destroying the vacuum, to restore the disiccated substances to a liquid state suitable for use.

Biological substances, as now commonly distributed and marketed, are packaged and sealed in a liquid state. Products so marketed and distributed tend to deteriorate and to lose their biological properties, and the marketing of such products in such form involves a serious economic loss, both because of the loss of biological activity or potency of the products between the time of manufacture and the times of use, and because of the large proportoin of such products which must be discarded because of deterioration on storage. Such products are commonly sold with a fixed expiration date after which they are not to be used, and a large proportion are not used before their expiration date has passed and must be discarded.

It has been proposed to improve the stability and keeping properties of such biologically active substances by freezing such products and drying, that is, removing water from, the frozen products under a high vacuum, both in bulk and in final containers. It has also been proposed to seal such products, after desiccation, in containers under a high vacuum, such as in sealed glass ampoules, or in containers provided with perforable closures, such as rubber stoppers.

The desiccated hiologically active substances are very porous, and it is important to seal and distribute them under a vacuum, both to prevent any deterioration which might be caused by contact with air, and to facilitate the dissolving of the material in water or other aqueous fluid when restoration is desired. If the material is maintained under a vacuum, and water is introduced into the container before the vacuum is broken, the vacuum tends to pull the water into the pores and interstices of the material, insuring intimate contact of the water with the material. If air or other gas is introduced into the container before the water is introduced, the material tends to become air-bound, with the result that the water does not readily penetrate into it and the material does not dissolve rapidly.

When the desiccated material is sealed in a glass ampoule under a vacuum, it is necessary, when it is desired to restore the material to a liquid state, to break the ampoule, with consequent destruction of the vacuum, and with the result that the material becomes air-bound and does not dissolve readily in the water and must be shaken vigorously or allowed to remain in contact with the water for a considerable period of time before it dissolves. However, where a glass sealed ampoule is used, there is absolute assurance that the material is maintained under a high vacuum, and free from contact with air or moisture or contamination, regardless of how long a period of time it may be stored.

When the material is sealed in a container having a perforable closure, such as a rubber stopper, water or other liquid may be introduced into the container, as by means of a hypodermic needle, without destroying the vacuum to enable the material to be restored to a liquid state. Under such conditions, and where the water or liquid is introduced without destroying the vacuum, the material dissolves rapidly and readily, because of the intimate contact between the liquid and the desiccated material.

The object of the present invention is to provide for the preservation of desiccated biologically-active substances in containers which have the advantages of the glass sealed ampoules and of the containers provided with a perforable closure, that is, in containers provided with an all-glass seal, yet of such construction that water may be introduced to restore the material to a liquid state without breaking the vacuum within the container.

In accordance with the present invention a suitable vial or container, preferably cylindrical in shape, provided with a relatively long tubular neck, the inside of which at the point adjacent the top of the vial or container is tapered to fit a rubber stopper, is provided. The size of the vial may be carried almost at will, its capacity being determined by the amount of material which it is intended to contain and being such as to contain one or more unit portions of the material. Thus the capacity of the container may vary from a fraction of a cubic centimeter to 50 or 100 or more cubic centimeters. The volume of the container, however, must be somewhat more than twice as great as the volume of the material intended to be processed therein, in order to provide adequate surface for the sublimation or evaporation of water therefrom. Thus if unconcentrated material is processed in the container, the container must have a volume of about twice the volume of the final restored product, whereas if concentrated material, such as material which has been concentrated to about one-half volume in a suitable manner, is processed within the container, the container may have an amount of desiccated material within it which on restoration to its normal liquid condition about fills the container. The neck of the vial, even where tapered, must be of sufficient size to permit the free flow of water vapor during the desiccation process.

In carrying out the desiccation, the material is originally frozen by exposure to a refrigerant maintained at a very low temperature, and is then subjected to the action of a high vacuum, the heat absorbed during the sublimation or vaporization which takes place being sufficient to maintain the material in a frozen state despite the flow of heat into the material from the atmosphere or surroundings. In order to maintain the sublimation or vaporization at a sufficiently rapid rate to prevent the melting of the material, it is necessary to provide an adequately large passageway for the vapors, and to avoid the use of vapor passages of too small a lumen, or with too many constrictions.

Into the container so provided is introduced the proper amount of biologically active substance to be treated, and this substance is then frozen, preferably while the container is in a more or less horizontal position to insure a maximum exposed surface for sublimation, and by exposure to a refrigerant maintained at a very low temperature, e. g. —70° C. The container is then attached to a vacuum manifold and subjected to the action of a high vacuum to remove the water from the frozen material. After the desiccation has proceeded to the desired extent, the container is removed from the vacuum manifold, and a rubber stopper is introduced into the neck and forced down to form a tight joint in the tapered portion of the neck. A hollow needle, such as a hypodermic needle, is then passed through the stopper, and the air in the container is removed through the needle, producing a vacuum within the container. The needle is then removed, with the result that the desiccated material is sealed within the container under a high vacuum with a perforable closure.

The glass neck of the vial, which extends considerably above the rubber stopper, is then flame-sealed, either while the vial is still attached to the vacuum manifold, or after removing the vial from the manifold and drawing a portion of the neck to a capillary tube, re-evacuating the neck and flame-sealing the neck at the point where it has been drawn to a fine tube. It is advantageous to draw a portion of the neck at the point of sealing to a fine tube before sealing as this simplifies the sealing operation, and insures the production of a vacuum-tight seal, without risk of the glass puncturing, as frequently occurs when tubes of relatively large diameter are flame-sealed under a vacuum. After the sealing, or before, the tube or neck of the vial is etched or scratched a little below the top of the rubber stopper, so that it may be readily broken off at this point. The desiccated material so produced is maintained as a formed porous mass, having the shape and volume of the frozen material from which it is produced, without change in its physical structure after desiccation, and having an immense network of capillaries or pores.

When it is desired to use the material within the container, it is merely necessary to break off the neck or tube at the etched or scratched point and introduce water or aqueous fluid into the container by means of a hypodermic needle or similar device which is readily forced through the perforable rubber stopper. The vacuum, which is maintained within the container, during storage by means of the glass seal, and just prior to restoration by means of the rubber stopper, facilitates the introduction of water and insures the complete and speedy dissolving of the material in the water.

The invention will be further illustrated and explained in connection with the drawing, which illustrates a container which embodies the invention and the various stages in its production and use, but the invention is not limited thereto.

In the drawing:

Fig. 1 is a sectional view of the container after the desiccated material has been produced therein;

Fig. 2 is a sectional view of the container after the rubber stopper has been introduced into the neck, showing the means by which a vacuum is produced in the container;

Fig. 3 is a view showing the final container, after sealing; and

Fig. 4 is a view showing the container after the neck containing the perforable stopper is broken off and showing the means by which water may be introduced.

In Fig. 1, 10 represents a vial or container of suitable size intended for the marketing or distribution of a desiccated serum or other biologically active substance, containing a desiccated biologically active substance 11 which is produced in the container by introducing into the container a liquid biologically active substance, freezing it rapidly by immersing the container in a refrigerant maintained at a very low temperature, e. g. —70° C., attaching the container to a vacuum manifold and subliming or evaporating the ice therefrom with the aid of a high vacuum. The container is provided with a relatively long neck 12, of sufficient diameter to provide for the free flow of vapors from the interior of the container, which neck has a tapered portion 13 near the top of the vial proper.

After the desiccated material has been produced within the container 10, the container is removed from the vacuum apparatus and a perforable stopper, e. g., a rubber stopper, such as the stopper 14 shown in Fig. 2, is introduced into the neck 12 and forced into tight engagement with the tapered portion 13 of the neck which forms an interlock with the stopper to prevent inward movement of the stopper. This stopper is advantageously provided with a passage 15 part way through it to facilitate the passage of a needle. After the stopper is thus forced into position, a hollow needle 16 suitably connected by connection 17 to a suitable vacuum device is passed through the perforable stopper. The interior of the container is thus exhausted, and after a vacuum is produced within the container, the needle is withdrawn. The stopper 14 then serves to hold the vacuum within the container. The neck 12 of the vial is then flame-sealed, to produce a container such as illustrated in Fig. 3. In order to seal the neck of the container, it is advantageous to heat a portion of the neck by means of a broad flame and draw it to capillary dimensions and then to connect the neck again to a vacuum pump or manifold and seal it by means of a flame. By following this procedure, a seal such as shown at 18 is obtained, with the portion of the neck between the stopper 14 and the seal 18 evacuated as well as the interior of the container 10. With special precautions, or with the use of certain types of glass, such as Pyrex glass, the neck 12 may be sealed while a vacuum is maintained therein, without first drawing a portion of it to a fine tube, but it is advantageous to draw a portion to a fine tube before sealing, as this simplifies the production of a proper seal, and avoids the difficulties encountered in sealing a relatively large tube under a high vacuum.

I have described the flame-sealing of the neck of the vial or container while the neck is connected to a vacuum, to insure the presence of a vacuum in the sealed neck between the rubber stopper and the glass seal, as this is a particularly advantageous method of sealing the containers, and is the method which I prefer to use. The container so produced, having a vacuum both in the container proper and in the neck between the rubber stopper and the glass seal, is a form of container which I prefer and which is particularly advantageous. Nevertheless, my invention is not limited to the production of such containers, or to such containers, as the glass seal may be made without connecting the neck to a vacuum, and without producing a vacuum within the neck, particularly with those containers in which the volume of the container is relatively large, and is many times as great as the volume of the neck, or that portion of the neck between the rubber stopper and the glass seal, without departing from the scope of my invention. When the neck is flame-sealed without first producing a vacuum within the neck, the air within is greatly attenuated by the heat required to seal the glass and is free from any appreciable amount of moisture so that there is but little air present above the rubber stopper to penetrate past the stopper into the container, and almost no moisture, so that, despite the fact that some air may enter the container, the amount which can enter is small, and the amount of moisture which can enter is almost infinitesimal, so that the vacuum within the container, particularly where the container is relatively large, is not impaired to any great degree, and sufficient air to interfere with the proper solution of the material on the introduction of water cannot enter the container.

When it is desired to restore the material, it is simply necessary to break off the upper portion of the neck 12, this portion of the neck being etched or scratched as at 19 (Fig. 3) to facilitate the breaking off of the upper portion of the neck, producing a container having a rubber stopper as shown in Fig. 4, and introduce the needle 20 of a hypodermic syringe, or a needle suitably connected to a vial containing water, so that the water can flow through the needle into the container without permitting the entrance of air. After the proper amount of water has been so introduced, and after the desiccated material has been thoroughly wetted and penetrated by the water, the vacuum within the container aiding in this wetting and penetrating, air is introduced into the container, both to force the water into intimate contact with the inner portions of the desiccated material and to permit the withdrawal of the restored liquid material by means of the syringe.

It will thus be seen that by the present invention, I provide for the preservation of desiccated biologically active substances in a final container having an all-glass seal to insure the maintenance of the vacuum under which the desiccated material is maintained and to insure that no moisture or any contaminating substances may enter the container, and yet which is provided with an interior perforable seal which permits the introduction of water or other liquid by means of a needle or the like without destroying the vacuum within the container and which is adequate to maintain the vacuum within the container for such periods of time as may be required in the restoration of the material to a liquid state, or in the production of the glass seal. The perforable seal, which is made of rubber or similar material, is protected from deterioration and from exposure by being sealed within the neck of the glass container.

This application is directed to the method and the operation described in, and is a division of, my copending application Serial No. 90,032, filed July 10, 1936, which latter covers the completed article obtained by the use of the method and operation.

I claim:

1. The method of producing desiccated biologically active substances from liquid biologically active substances and retaining the sterility thereof in a sealed evacuated container having a neck of sufficient length to receive a tightly fitting stopper within it and to leave an extension of the neck beyond the cap of the stopper, which method comprises introducing a liquid biologically active substance into a container, desiccating such substance, after freezing, with the aid of a vacuum, introducing a perforable stopper into the neck of the container, evacuating said container through a tube or hollow needle passed through said stopper, and flame-sealing the extension of said neck above said stopper.

2. The method of producing desiccated biologically active substances from liquid biologically active substances and retaining the sterility thereof in a sealed evacuated container having a neck of sufficient length to receive a tightly fitting stopper within it and to leave an extension of the neck beyond the cap of the stopper, which method comprises introducing a liquid biologically active substance into a container, desiccating such substance, after freezing, with the aid of a vacuum, introducing a perforable stopper into the neck of the container, evacuating said container through a tube or hollow needle passed through said stopper, evacuating said neck above said stopper, and flame-sealing the extension of said neck above said stopper while maintaining a vacuum in said neck.

3. The method of producing desiccated biologically active substances in sealed, evacuated containers, from liquid biologically active substances, whereby the finished sealed container has a rubber stopper held in tight engagement within a sealed neck of the container with the stopper forming a portion of the envelope of that part of the glass container holding the desiccated biologically active substance, which method comprises introducing a liquid biologically active substance into a container, desiccating such substance, after freezing, with the aid of a vacuum, introducing a perforable stopper into a neck of the container and far enough to leave an extension of the neck above the stopper, evacuating said container through a tube or hollow needle passed through said stopper, and flame-sealing the extension of said neck above said stopper.

4. The method of producing desiccated biologically active substances in sealed, evacuated containers, from liquid biologically active substances, whereby the finished sealed container has a rubber stopper held in tight engagement within a sealed neck of the container with the stopper forming a portion of the envelope of that part of the glass container holding the desiccated biologically active substance, which method comprises introducing a liquid biologically active substance into a container, desiccating such substance, after freezing, with the aid of a vacuum, introducing a perforable stopper into a neck of the container and far enough to leave an extension of the neck above the stopper, evacuating said container through a tube or hollow needle passed through said stopper, and flame-sealing the extension of said neck above said stopper while maintaining a vacuum in said neck.

JOHN REICHEL.